April 17, 1962  F. J. BAUDHUIN ET AL  3,029,847
DISPENSING APPARATUS
Filed Sept. 25, 1958  5 Sheets-Sheet 1

Inventors
Francis J. Baudhuin
Frederick H. Heiss
Gilbert N. Jensen
Clarence H. Hager
By McCanna, Morsbach & Pillote
Atty's Inventors
Francis J. Baudhuin
Frederick H. Heiss
Gilbert W. Jensen
Clarence H. Hager
By McCanna, Morsbach & Pillote
Atty's April 17, 1962 F. J. BAUDHUIN ET AL 3,029,847
DISPENSING APPARATUS
Filed Sept. 25, 1958 5 Sheets-Sheet 3
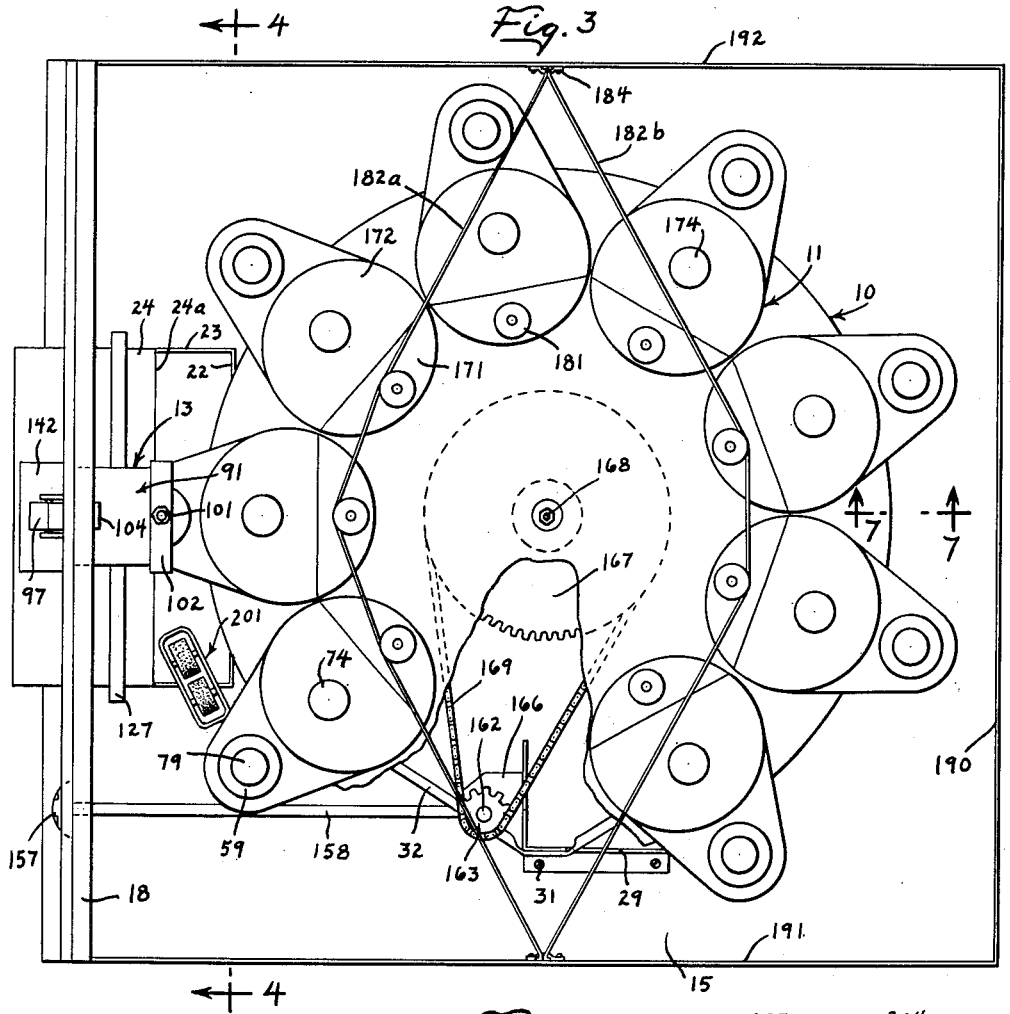
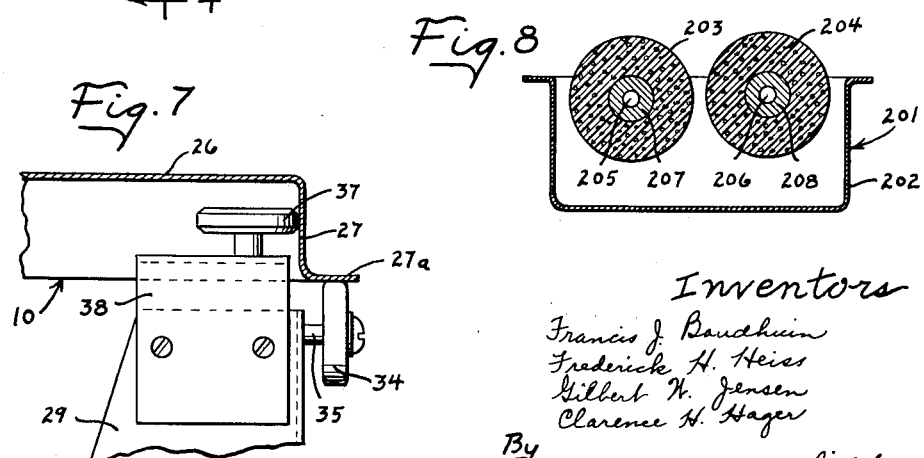
Inventors
Francis J. Baudhuin
Frederick H. Heiss
Gilbert W. Jensen
Clarence H. Hager
By
McCanna, Morsbach & Pillote
Atty's

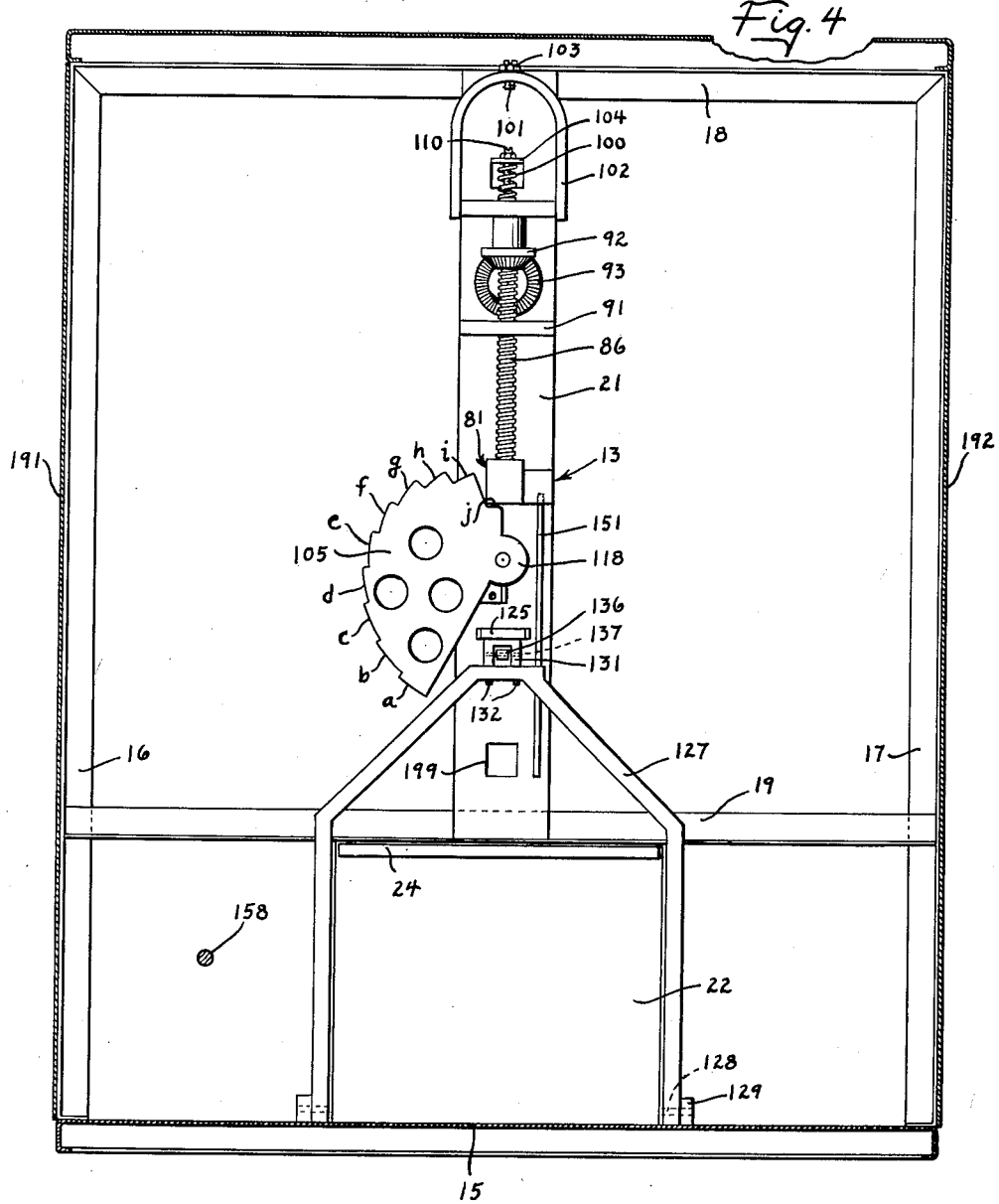

April 17, 1962  F. J. BAUDHUIN ET AL  3,029,847
DISPENSING APPARATUS
Filed Sept. 25, 1958  5 Sheets-Sheet 5

Inventors
Francis J. Baudhuin
Frederick H. Heiss
Gilbert W. Jensen
Clarence H. Hager
By McCanna, Morsbach & Pillote
Att'ys

3,029,847
DISPENSING APPARATUS

Francis J. Baudhuin and Frederick H. Heiss, Rockford, Gilbert W. Jensen, Loves Park, and Clarence H. Hager, Rockford, Ill., assignors, by mesne assignments, to Valspar Corporation, Rockford, Ill., a corporation of Delaware
Filed Sept. 25, 1958, Ser. No. 763,358
24 Claims. (Cl. 141—104)

This invention relates to a dispensing machine and particularly to a machine for dispensing fluid materials such as paint colorants, paints, and the like.

The machine of the present invention generally includes a plurality of receptacles for storing the material to be dispensed and a piston type measuring chamber individual to each receptacle. The several receptacles and measuring chambers are mounted on a rotatable carrier to permit each of the measuring chambers to be selectively advanced to a dispensing station. A reciprocable operating mechanism is provided at the dispensing station for extending and retracting the piston in the measuring chamber at the dispensing station to discharge a preselected quantity of material therefrom.

In such apparatus, the amount of material dispensed, for any given stroke of the operating mechanism, will vary if the position of the measuring chamber at the discharge station shifts from a preselected position when the dispensing piston is extended or retracted. Moreover, when dispensing viscous materials such as paint colorants and paints, relatively high pressure must be applied to the piston in the measuring chamber during the dispensing operation, which pressure not only tends to shift the measuring chamber but also loads the movable support for the receptacle and measuring chambers.

An important object of this invention is to provide a dispensing machine of this type which can be economically fabricated and which has improved accuracy to enable accurate and repetitive dispensing of a preselected quantity of material from any one of the several measuring chambers.

A more particular object of this invention is to provide a dispensing machine of this type having an apparatus at the dispensing station for directly supporting the individual measuring chambers at the dispensing station to prevent shifting of the measuring chambers during the dispensing operation and thereby provide more accurate dispensing of the material.

Another object of this invention is to provide a support apparatus in accordance with the foregoing object and which is also operative to locate the selected measuring chamber at the dispensing station in alignment with the operating mechanism thereat.

A further object of this invention is to provide an interlock device for the aforedescribed dispensing machine to prevent dispensing of material whenever the measuring chamber support apparatus is not in proper position to support the measuring chamber and also to prevent indexing of the measuring chambers when the reciprocable operating mechanism is not in its retracted position.

Still another object of this invention is to provide an improved construction for the material receptacle and for mounting the measuring chamber thereon and which enables the use of light weight and economical materials in the fabrication of the receptacles and the support therefor.

These, together with various ancillary objects and advantages of this invention will be more readily appreciated as the same becomes better understood by reference to the following detailed description when taken in connection with the accompanying drawings wherein:

FIG. 3 is a top plan view of the dispensing mechanism, with the cover removed, and illustrating the arrangement of the material receptacles and the drive therefor;

FIG. 4 is a vertical sectional view taken on the plane 4—4 of FIG. 3 and illustrating the operating mechanism for the measuring cylinder in its extended position;

FIG. 7 is a fragmentary sectional view taken on the plane 7—7 of FIG. 3 and illustrating the roller arrangement for rotatably supporting the receptacle carrier, and FIG. 8 is an enlarged sectional view through the nozzle tip wiper assembly.

In general, the dispensing machine of the present invention includes a rotatable carrier 10 having a plurality of annularly spaced material receptacles 11 thereon and which receptacles have a measuring chamber 12 individual thereto. A piston type dispensing mechanism is disposed in each chamber and a common operating mechanism 13 is provided at a dispensing station for reciprocating the pistons through a preselected, selectively variable stroke to dispense a measured quantity of material therefrom.

Figure 1:
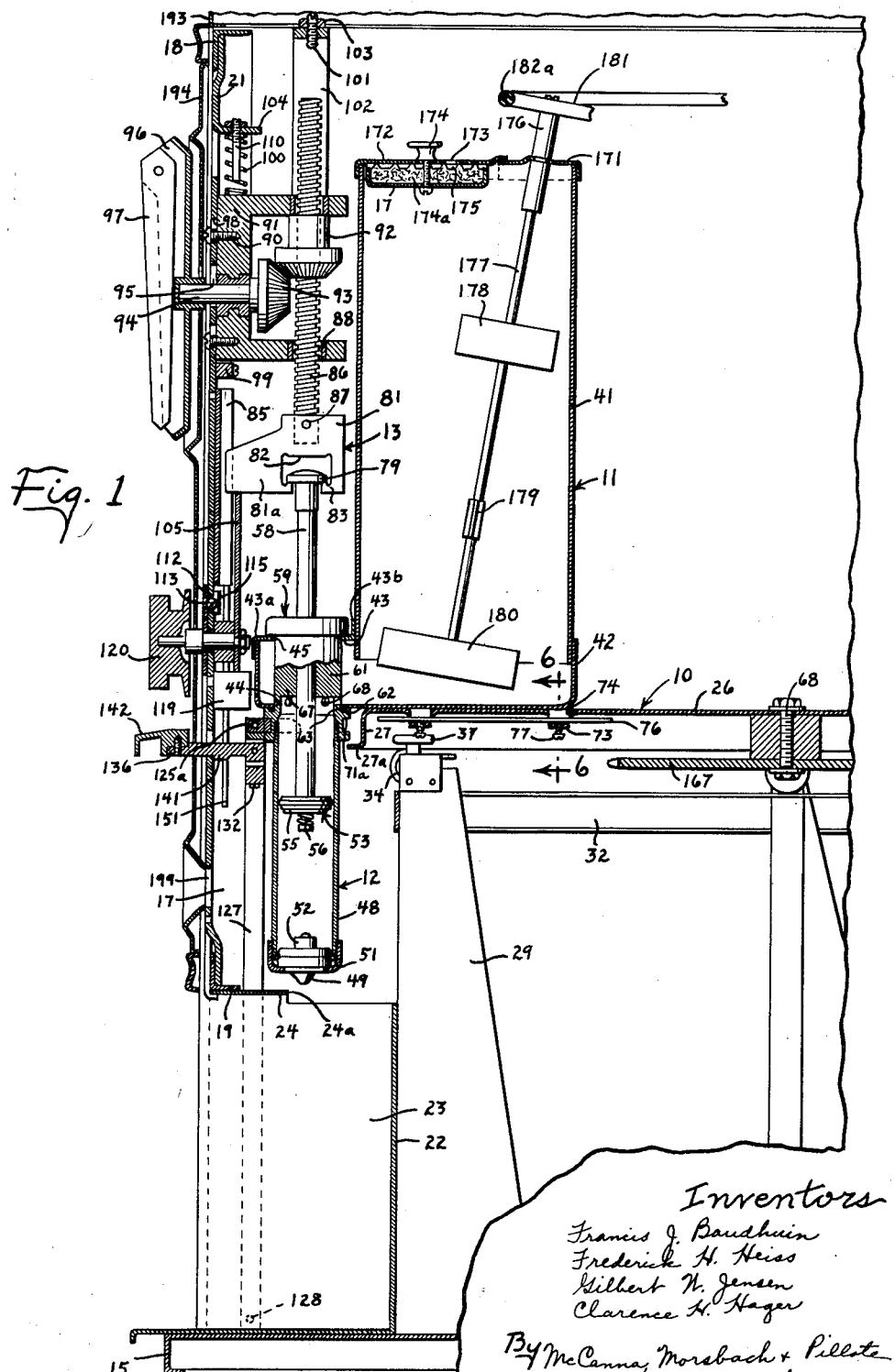
FIGURE 1 is a fragmentary vertical sectional view through the dispensing machine.
Figure 2:
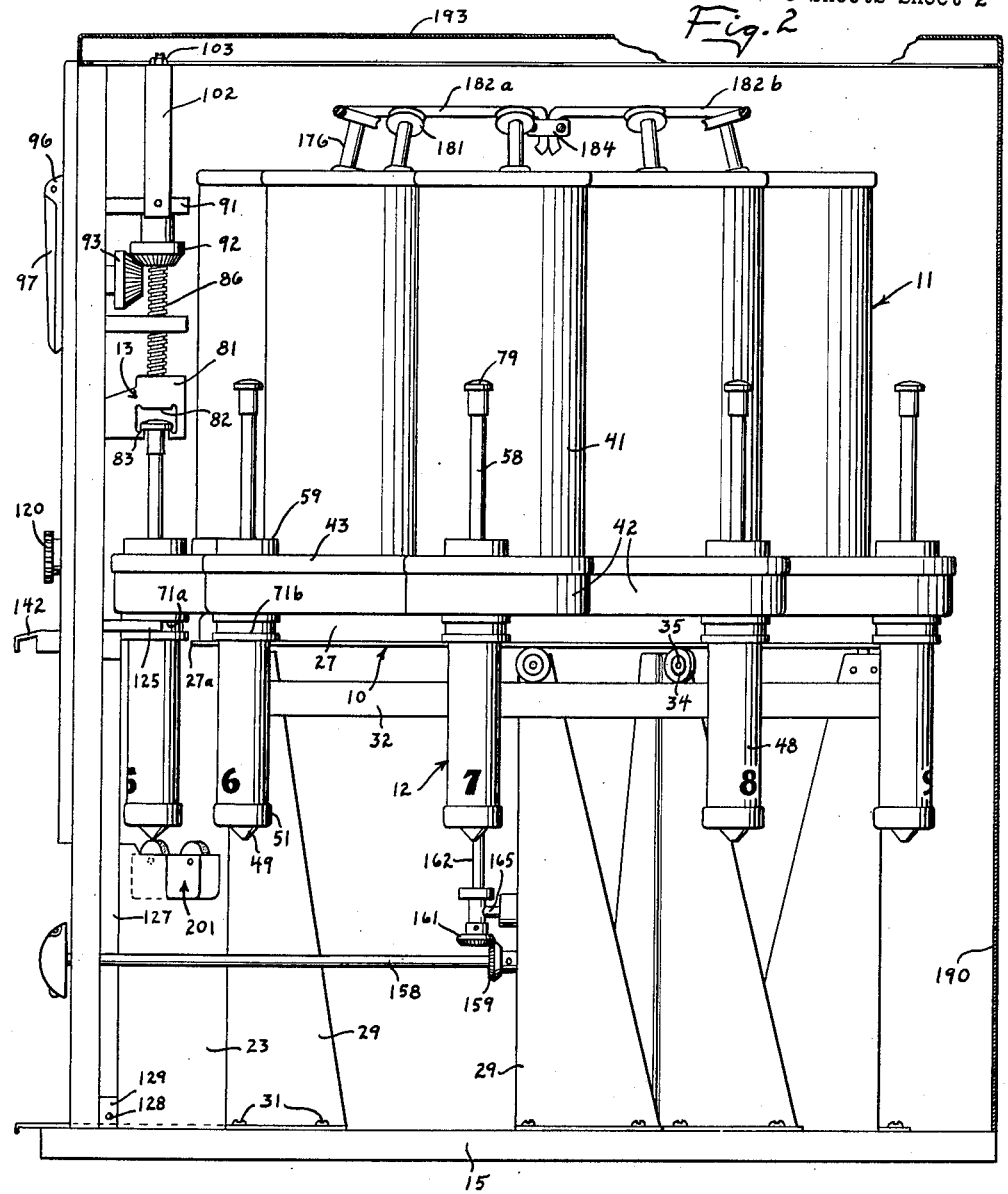
FIG. 2 is a side elevational view of the dispensing machine with the side panel removed to illustrate the internal construction of the same.

Referring more specifically to FIGURES 1, 2 and 4 of the drawings it will be seen that the dispensing mechanism includes a base 15 having an angle iron frame provided at the front side thereof and formed by upright posts 16 and 17, upper cross member 18 and intermediate cross member 19. A heavy support plate 21 is disposed medially between the posts 16 and 17 and is secured at opposite ends thereof to the upper and intermediate cross members 18 and 19. The operating mechanism 13 is attached to the rigid support plate 21, in a manner described more fully hereinafter, and an open sided box defined by rear panel 22, side panels 23 and top panel 24 is disposed below the intermediate cross member 19 at a position below the support plate 21 to define a dispensing station thereat. An opening 24a is provided in the top panel to permit material to be dispensed from a measuring chamber 12 at the dispensing station into a container (not shown) disposed in the box.

The carrier 10 comprises a generally circular plate 26 having a depending flange 27 extending around the periphery thereof, which flange preferably terminates in an outwardly extending rim 27a. In accordance with the present invention, the carrier is rotatably supported on the base 15 by means of a plurality of annularly spaced support legs 29 each having a generally L-shaped cross-section. The lower ends of the legs are affixed to the base, as by fasteners 31, and taper upwardly as is clearly shown in FIGS. 2 and 3. A brace band 32 is attached to the upper ends of each of the legs 29 and extends therebetween. A first set of rollers 34 are mounted by pintles 35 (see FIG. 7) on the upper ends of the legs 29 for rotation about an axis extending radially of the carrier plate 26. Conveniently, the legs 29 may be so arranged that one side thereof is disposed parallel to the tangent of the carrier plate at that point and a roller 34 is mounted by the pintle to be disposed alongside the leg to engage the outwardly extending rim 27a on the carrier to support the latter. A second set of rollers 37 are each mounted, as by L-shaped brackets 38 on the upper ends of the posts 29 for rotation about an upright axis. These rollers engage the inner periphery of the flange 27 to maintain the carrier centered with respect to the support legs. As is apparent, with this arrangement the carrier plate is supported solely at its outer periphery.

Figure 5:
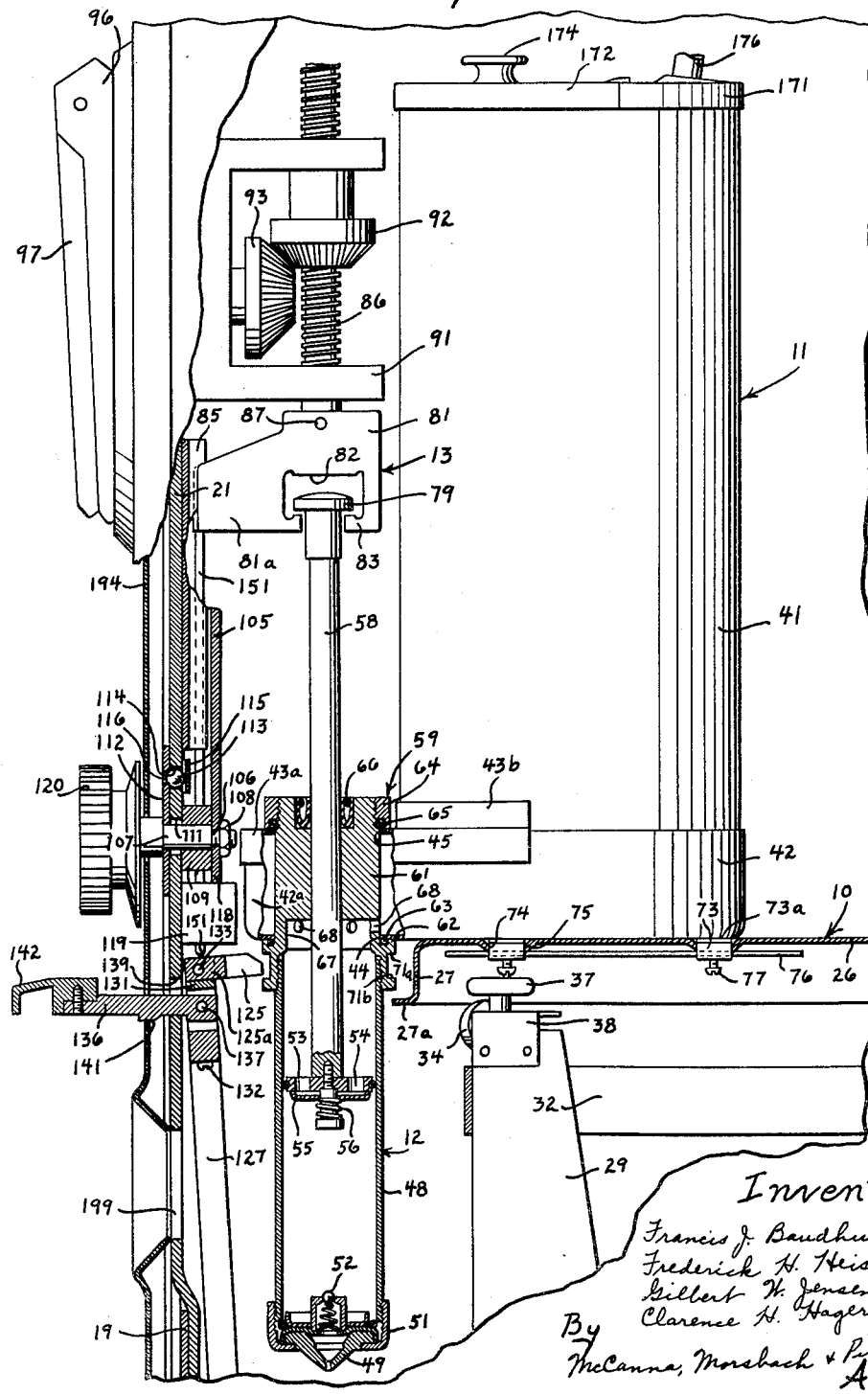
FIG. 5 is an enlarged fragmentary vertical sectional view illustrating the operating mechanism in its retracted position.

The material receptacles 11 are preferably formed of light weight sheet stock and as herein shown include a tubular sleeve 41 and an elongated dish shaped bottom member 42 rigidly attached to the lower end of the sleeve, as by welding. As herein shown, the sleeve is of circular cross-section, it being understood that other sleeve configurations may be used if desired. The dish shaped bottom 42 has a portion 42a thereof which extends laterally of the sleeve 41 and a cover member 43 is provided for closing the top of this extension. As shown in FIGURES 1 and 5, the cover member 43 has a depending flange 43a which is welded to the peripheral wall of the bottom member 42 and an upstanding flange 43b which is welded to the sleeve 41. Aligned openings 44 and 45 are provided in the bottom member 42 and in the cover member 43 respectively.

The measuring chambers 12 each include a cylinder 48 having a nozzle 49 supported by a flanged cap 51 at the lower end of the cylinder. A check valve 52 is provided and arranged to open when the dispensing piston 53 is moved downwardly and permit liquid to flow through the nozzle 49 into the container therebelow, and which check valve closes when the piston is retracted to thereby minimize dripping from the measuring chamber. The piston 53 has a plurality of ports 54 therein and a valve member 55 is biased by a spring 56 to a position closing the ports. As is apparent, the valve member 55 closes the ports 54 as the piston is moved downwardly in a dispensing stroke, and opens when the piston is retracted to permit the material to flow thereby into the lower portion of the cylinder preparatory to the next dispensing operation. A piston rod 58 is attached to the piston 53 and an improved piston rod guide member 59 is mounted on the receptacle 11 and arranged to support the cylinder 48 and to guide the piston rod 58. The piston rod guide member 59 comprises a rigid block 61 which extends through the aligned openings 44 and 45 in the bottom member and cover member of the receptacle 11 and which block has an enlarged portion at one end thereof defining a flange 62 arranged to engage the underside of the bottom member 42. An O-ring 63 is disposed in a groove and is arranged to seal the interface between the guide block and the bottom member of the receptacle. The upper end of the guide member is externally threaded and receives a threaded ring 64 which engages the cover member 43. An O-ring 65 is disposed in a groove in the ring 64 and seals the guide block to the cover member 43. A piston rod seal 66 is carried by the upper end of the guide block.

Figure 6:
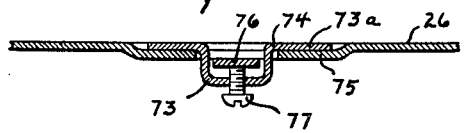
FIG. 6 is an enlarged fragmentary sectional view through the receptacle taken on the plane 6—6 of FIG. 1 and illustrating the manner of attaching the individual receptacles to the rotary support plate therefor.

The lower end of the guide block is counterbored to define a chamber 67 which communicates through ports 68 with the interior of the material receptacle 11. The lower end of this chamber is internally threaded to threadedly receive the upper end of the cylinder 48 and support the same thereon. For reasons set forth more fully hereinafter, each of the guide blocks has a peripheral groove or recess formed in the outer periphery thereof and defining spaced upper and lower shoulders 71a and 71b. The receptacles 11 are preferably detachably supported on the carrier 10 to enable easy removal for cleaning, repair or the like and, as shown in FIGURES 1, 5 and 6, a pair of generally U-shaped brackets 73 having outwardly extending flanges 73a thereon are attached to the underside of the bottom member 42. The brackets extend through openings 74 in the carrier plate 26, which plate is dished slightly as indicated at 75 to receive the flanges on the brackets 73. A locking bar 76 extends through the U-shaped brackets 73 and is clamped against the underside of the carrier plate 26 by screws 77 to firmly, but detachably retain the receptacles on the carrier plate. With this arrangement, it is only necessary to loosen the easily accessible screws 77 at the underside of the carrier and remove the locking bar 76 to enable removal of the receptacle 11 along with the measuring cylinder 12 attached thereto.

The piston rods 58 individual to each of the measuring chambers 12 have an enlarged head 79 on the upper end thereof. The operating mechanism 13 includes a jaw 81 having a downwardly facing anvil 82 arranged to engage the head 79 and move the piston rod downwardly as the jaw is extended, and inwardly extending fingers 83 spaced from the anvil 82 a distance greater than the depth of the head 79 and arranged to engage the underside of the same when the jaw is retracted to thereby raise the piston rod 58. As shown, the jaw 81 is constrained against rotation by means of a vertical guideway 85 attached to the rear of the support plate 21 and which guideway engages a lateral projection 81a on the jaw. The jaw may be reciprocated by any suitable mechanism and is herein shown operated manually. A screw 86 is connected to the jaw 81 by a pin 87 and is guided by bearings 88 and 89 in a gear block 91. The gear block is also attached to the rear face of the support plate 21 and bevel gears 92 and 93 are respectively threadedly received on the shaft 86 and rotatably supported on a stub shaft 94 so that, by rotating the shaft 94, the gears 93 and 92 can be turned to elevate and lower the screw 86. As best shown in FIGURE 1, the shaft 94 extends through a vertically elongated opening 95 in the support plate 21 and a crank 96 having a swingably mounted handle member 97 is secured to the outer end of the stub shaft 94 for selectively rotating the latter.

For reasons set forth more fully hereinafter, the gear block 91 is mounted for limited vertical sliding movement on the support plate 21 as by screws 90, which extend through vertically elongated openings 98 in the support plate and are threaded into the block. The gear block is normally urged to its lower position against a stop block 99 by a compression spring 100. The spring 100 is interposed between a bracket 104 on the support plate 21 and the top of the block 91 and a guide pin 110 is attached to the bracket and extends downwardly inside the spring.

Provision is made for adjusting the stroke of the jaw 13 to control the amount of material dispensed. The upper position of the jaw is determined by a stop 101, herein shown in the form of a screw threadedly received in a bail 102 attached to the gear block 91 and which stop overlies the upper end of the screw 86 to engage the latter when it is raised. The stop screw 101 may be threaded in the bail 102 to enable calibration of the dispensing mechanism and a lock nut 103 is provided for locking the stop screw in its adjusted position. The lower position of the jaw 81 is determined by an adjustable cam plate 105. The cam plate 105 is mounted in the support plate 21 for rotation about an axis extending generally radially of the carrier 10 and has a plurality of cam faces designated a–j inclusive which are spaced at different radial distances from the center of rotation of the cam. As is apparent from FIG. 4, the cam is rotatable to position any selected one of the faces a–j in the path of movement of the jaw 81 to thereby selectively vary the stroke of the jaw 81.

More particularly, the cam plate 105 is non-rotatably attached to the reduced end 106 of the stub shaft 107, as by a nut 108. A spacer block 109 is interposed between the cam plate 105 and the support plate 21 and the stub shaft loosely extends through an opening 111 in the support plate so that the shaft is adapted for limited lateral movement relative to the support plate. A detent plate 112 is non-rotatably carried by the shaft 107, and disposed at the outer side of the support plate 21. A locking ball 113 is disposed in an opening 114 in the support plate and yieldably urged by a spring 115 into the openings 116 in the detent plate. These openings 116 are so arranged as to align with the ball when a respective one of the cam surfaces a–j is aligned with the jaw 81 to releasably lock the cam plate in any preselected adjusted position thereof. The cam plate 105 also has a circular support surface 118 disposed concentric with the shaft 105, and which support surface is arranged to engage a laterally extending bracket 119 carried by the rear side of the support plate 21. Since the shaft 107 is adapted for limited lateral movement in the opening 111, it will be seen that the cam 105 will move downwardly when the jaw engages the same until the surface 118 rests upon the bracket 119 to be supported thereby. With this arrangement, the pressure applied to the cam 105 is not transmitted to the shaft 107 but is instead applied directly to the bracket 119. A knob 120 is attached to the stub shaft 107 for rotating the same.

In accordance with the present invention, provision is made for supporting the measuring chamber at the dispensing station directly on the main frame of the machine and independent of the rotatable support for the carrier 10. This arrangement assures that each of the measuring cylinders will be supported at exactly the same position, when they are positioned to the dispensing station. In addition, since an appreciable pressure is applied to the dispensing piston during the dispensing operation, supporting of the measuring cylinder at the dispensing station prevents transmission of this pressure to the receptacle associated with the cylinder and to the rotatable support for the carrier. This, in turn, enables the use of a relatively light weight receptacle and support for the carrier. In addition, the measuring cylinder support is arranged to center the measuring cylinder with respect to the operating jaw 81 to assure that they are properly aligned during the dispensing operation.

More particularly, the measuring cylinder support comprises a generally U-shaped member 125 which is movable laterally into and out of engagement with the piston rod guide block. The U-shaped member 125 is arranged to extend partially around the guide block to center the measuring cylinder with respect to the jaw 81 and is also arranged to closely underlie the downwardly facing shoulder 71 on the guide block to directly support the measuring cylinder on the frame of the machine. As shown herein, the U-shaped member 125 is mounted on the upper end of a generally upright support yoke 127. The yoke straddles the box at the dispensing station, as best shown in FIGURE 4 and is mounted by pins 128 on blocks 129 for swinging movement toward and away from the measuring cylinder. A generally H-shaped block 131 is attached to the upper end of the yoke 127, as by fasteners 132 and the U-shaped member 125 has an ear 125a thereon disposed between the upper legs of the H block and connected thereto by a pin 133. The U-shaped member is thus movable with the yoke 127 from its support position shown in FIGURE 1 to its disengaged position shown in FIG. 5. An operating lever 136 is pivotally connected by a pin 137 to the lower legs of the H block and extends through a vertically elongated opening 139 in the support plate 21. The lever 136 has a latch finger 141 on the underside thereof arranged to engage the support plate 21, when the support member 125 is in its support position shown in FIGURE 1, to lock the same in that position as shown in FIG. 1. A handle 142 is provided at the outer end of the lever to facilitate raising of the lever and pulling the same outwardly to move the yoke 127 and the support member 125 to the release position thereof shown in FIG. 5.

It is apparent that the receptacle carrier 10 cannot be turned so long as the support member 125 is in its locking position shown in FIG. 1. It is therefore necessary to move the support member to its release position shown in FIG. 5 before the carrier can be indexed to position a different measuring cylinder at the dispensing station. In accordance with the present invention, provision is also made for preventing actuation of the operating mechanism 13 until after the support member 125 has been moved to its support position shown in FIG. 1. This interlock mechanism may conveniently be in the form of a rod 151 (see FIGS. 1, 4 and 5) attached to the jaw 81 and extending downwardly therefrom. The rod 151 is dimensioned and arranged to engage the yoke 127, when the latter is in its retracted position shown in FIG. 5 to prevent downward movement of the jaw 81, and to pass alongside the yoke when the latter is in its extended position shown in FIG. 1. When the rod 151 passes alongside the yoke 127 as shown in FIG. 1, the rod lies in the path of movement of the yoke to the latters retracted position. Thus, the interlock rod 151 also prevents full retraction of the yoke 127, whenever the jaw 81 is not in its raised position shown in FIG. 1. This assures that the jaw 81 must be retracted to raise the piston at the dispensing station to its normal or retracted position before the carrier can be rotated to position a different dispenser unit at the dispensing station.

When the support member 125 is retracted, the carrier 10 may be rotated to position different measuring cylinders at the dispensing station. Rotation of the carrier may be effected in any desired manner and is herein shown as manually indexed by means of a crank 157 located at the front of the dispensing machine. As shown in FIGS. 2 and 3, the crank is drivingly connected by means of a shaft 158, bevel gears 159 and 161 and upright shaft 162 to a drive sprocket 163. The horizontal shaft 158 may conveniently have its inner end rotatably supported on one of the upright legs 29 and the upright shaft 162 is also supported on the leg 29 as by bearings 165 and 166. An enlarged driven sprocket 167 is fastened to the underside of the carrier 10, as by a fastener 168 and is drivingly connected by a chain 169 to the drive sprocket 163. Conveniently, the gearing and sprockets may be so arranged that one revolution of the shaft 158 by crank 157 turns the carrier through an arc corresponding to the angular spacing between adjacent receptacles 11. In the present arrangement wherein there are provided nine receptacles, nine revolutions of the shaft 158 will turn the carrier through one complete revolution.

The upper ends of each of the receptacles 11 are closed by a top cover including a fixed portion 171 which is secured to the upper end of the sleeve 41 and a removable portion 172. A knob 174 is attached to the removable portion 172 to enable opening of the same when replenishing the paint colorant in the receptacle. A vent opening 173 (FIG. 1) is provided to maintain atmospheric pressure in the receptacle as colorant is intermittently withdrawn therefrom. A chamber is formed at the underside of the cover below the opening 173, as by a dished member 174 having vent notches 175, to receive an absorbent pad 174a. The pad is advantageously impregnated with a material containing a thinning agent to maintain a saturated atmosphere in the receptacle and an anti-oxidant to prevent "skinning" of the colorant.

The fixed portion 171 has a bearing 176 mounted thereon and inclined downwardly and outwardly, as shown in FIG. 1. The bearing rotatably supports a stirring rod 177, which stirring rod has a plurality of agitating elements or paddles 178–180 spaced longitudinally thereon. A pulley 181 is mounted on the upper end of each of these stirring rods and frictionally engages resilient belts 182a and 182b. As best shown in FIGS. 2 and 3, the belts have the ends thereof attached, as by brackets 184 on the sides of the machine. Each of the pulleys 181 engage both belts 182a and 182b during a portion of each revolution of the cannister so that the stirring rods 177 are intermittently rotated to agitate the contents of the cannisters.

The machine is preferably enclosed and includes side panels 191 and 192, top panel 193, a front panel 194, and rear panel 190. In order to facilitate determining which measuring cylinder is located at the dispensing station, a view opening 199 is provided in the front panel 194 and support plate 21 adjacent the measuring cylinders 12 and each of the cylinders is marked with suitable indicia (see FIG. 2) so that the identity of the measuring chamber at the dispensing station can be visually determined.

Some colorant tends to collect on the tips of the nozzles 49 and a wiper 201 is provided for cleaning the tips to prevent dripping of colorant from the nozzles. This wiper includes a receptacle 202 mounted as shown in FIG. 3 to extend generally tangentially of the circle described by the nozzle tips 49 as the carrier 10 is rotated. Improved cleaning of the nozzle tips is effected by the use of a pair of rollers 203 and 204 (see FIG. 8) which are mounted by shafts 205 and 206 on the receptacle to extend thereinto. The rollers are arranged to sequentially engage each of the nozzle tips, as the carrier is rotated, and wipe the excess colorant therefrom. The receptacle is filled to a level above the bottom of the rollers with a thinner which dissolves the colorant from the tips of the nozzles. Preferably, the rollers are formed of a sponge-like plastic foam having inter-communicating cells which draw the paint thinner upwardly by capillary action and maintain the upper surface of the rollers relatively moist. The sponge rollers are affixed to central hubs 207 and 208, formed of a solid material such as plastic, wood or the like, and which rotatably receive the shafts.

From the foregoing, it is thought that the operation of the device will be readily understood. Briefly, the carrier 10 is rotated by turning the crank 157 to position a selected one of the measuring cylinders 12 at the dispensing station. The indicia on the measuring cylinder at the dispensing station move past the view opening 199 to enable visual determination of when the proper cylinder is in dispensing position. The handle 142 is then lifted and pushed inwardly to move the support member 125 from the position shown in FIG. 5 to the position shown in FIG. 1. This member aligns the measuring cylinder with operating mechanism 13 and also supports the same as the piston 53 is extended and retracted to inhibit movement of the measuring cylinder and thereby provide more accurate dispensing.

The cam 105 is then rotated by knob 120 to preset the amount of material to be dispensed, and the crank 97 thereafter rotated, first in one direction to extend the jaw 81 until the nose 81a engages the cam 105. The spring 100 is arranged to apply a preselected pressure onto the gear block to inhibit upward movement of the same. After the jaw 81 strikes the cam 105, continued turning of the crank 97 increases the pressure applied to the jaw until the pressure equals the preselected pressure applied by the spring. At that time, the gear block moves upwardly against the bias of spring 100 to thereby limit the pressure applied to the jaw. This not only prevents damage to the parts but also assures more accurate filling by regulating the pressure applied during the dispensing stroke. The crank is thereafter turned in the opposite direction to return the piston to its raised position. After the piston is returned to its raised position, the crank 97 is rotated in the first-mentioned direction through a part of a turn to move the fingers 83 away from the underside of the piston rod heads 79, as shown in FIG. 5. The jaw 81 is thus normally spaced from the piston rod heads 79 so that the carrier can rotate freely with the heads 79 passing through the jaws. As previously described, the interlock rod 151 prevents lowering of the jaw 81 until the support member 125 is in proper position as shown in FIG. 1. In addition, the interlock rod also prevents retraction of the support member 125 and turning of the carrier until after the jaw 81 has been retracted to its raised position. This assures that the piston rods 58 will always be returned to their raised position before indexing the carrier 26.

We claim:

1. In a dispensing apparatus a base, a frame on said base, a carrier rotatably mounted on said frame and including a plurality of annularly spaced dispensing units, said units each comprising a storage compartment, and a measuring chamber communicating therewith, a reciprocable dispensing member individual to each chamber for dispensing material therefrom, means for rotating said carrier to position a selected one of said dispensing units at a dispensing station, operating means at the dispensing station engageable with the reciprocable member associated with the dispensing unit thereat for moving the dispensing member in one direction to discharge material from one respective measuring chamber, and support means mounted on said frame and selectively movable into and out of engagement with the unit at the dispensing station to support the same against movement in said one direction, and to locate the respective measuring cylinder in the proper position with relation to said operating means, said support means including a downwardly opening generally upright yoke pivotally attached at the lower end thereof to said base for movement toward and away from said carrier, said yoke straddling said dispensing station to permit positioning of a receptacle between the legs thereof.

2. In a dispensing apparatus, the combination of a base, a carrier rotatably mounted on said base, means defining a plurality of separate compartments circumferentially spaced around said carrier, said compartments each having outwardly projecting extensions on the lower end thereof defined by spaced top and bottom walls and an interconnecting side wall, a measuring chamber individual to each compartment including a piston and a rod attached to said piston, said top and bottom walls of said extension having aligned openings therein, a piston rod guide member individual to each compartment extending through said openings and attached to said extensions, each of said members supporting a respective one of said measuring chambers and slidably receiving the associated piston rod, means for rotating said carrier to position a selected one of said measuring chambers at a dispensing station, and operating means engageable with the piston rod associated with the chamber at the dispensing station for moving the latter downwardly in a dispensing stroke.

3. In a dispensing apparatus, the combination of a base, a carrier rotatably mounted on said base, means defining a plurality of separate compartments circumferentially spaced around said carrier, said compartments each having outwardly projecting extensions on the lower end thereof defined by spaced top and bottom walls and an interconnecting side wall, a measuring chamber individual to each compartment including a piston and a rod attached to said piston, said top and bottom walls of said extension having aligned openings therein, a piston rod guide member individual to each compartment extending through said openings and attached to said extensions, each of said members supporting a respective one of said measuring chambers and slidably receiving the associated piston rod, means for rotating said carrier to position a selected one of said measuring chambers at a dispensing station, operating means engageable with the piston rod associated with the chamber at the dispensing station for moving the latter downwardly in a dispensing stroke, said guide member having a downwardly facing shoulder thereon, and support means mounted on said base and selectively movable into and out of engagement with said shoulder to support said guide member and the attached measuring chamber.

4. The combination of claim 3 wherein said support means includes a generally horizontally disposed yoke member arranged to extend partially around said guide member to thereby locate the associated measuring chamber in proper position with respect to said operating means.

5. The combination of claim 3 wherein said support means includes a downwardly opening generally upright support yoke pivotally attached at the lower end thereof to said base for movement toward and away from said carrier, said support yoke straddling said dispensing station to permit positioning of a receptacle between the legs thereof, a generally horizontally disposed locating yoke attached to the upper end of said support yoke and adapted to engage said guide member to support and locate the same at the dispensing station.

6. The combination of claim 5 including means for releasably latching said locating yoke in a position to support the measuring chamber.

7. In a dispensing apparatus, the combination of a base, a carrier rotatably mounted on said base, means defining a plurality of separate compartments circumferentially spaced around said carrier, said compartments each having outwardly projecting extensions on the lower end thereof defined by spaced top and bottom walls and an interconnecting side wall, a measuring chamber individual to each compartment including a piston and a rod attached to said piston, said top and bottom walls of said extension having aligned openings therein, a piston rod guide member individual to each compartment extending through said openings and attached to said extensions, each of said members supporting a respective one of said measuring chambers and slidably receiving the associated piston rod, means for rotating said carrier to position a selected one of said measuring chambers at a dispensing station, operating means engageable with the piston rod associated with the chamber at the dispensing station for moving the latter downwardly in a dispensing stroke, said guide member having a downwardly facing shoulder thereon, support means mounted on said base and movable from a first position to a second position underlying said shoulder to support said guide member and the attached measuring chamber against downward movement, and interlock means engageable with said support means when the latter is in said first position for preventing operation of said operating means.

8. In a dispensing apparatus, a multiple compartment carrier comprising a rotary canister mounting plate, a plurality of individual receptacles attached to said plate, said receptacles each including a sleeve, an elongated dish-shaped base on the lower end of said sleeve and having a portion extending laterally of said sleeve, a cover attached to the laterally extending portion of said base and to the lower end of said sleeve, said laterally extending portion of said base and said cover having aligned openings therein, a rigid guide member extending through said openings and sealed to said base and cover, a measuring cylinder attached to said guide member and extending downwardly therefrom, a piston in said cylinder having a rod thereon slidably received in said guide member, and passage means in said guide member communicating with the cylinder and with the receptacle intermediate said base and said cover to deliver material from the receptacle to the cylinder.

9. The combination of claim 8 wherein said mounting plate has a plurality of annularly spaced openings therein, a generally U-shaped bracket attached to the base of each receptacle and extending downwardly through said opening, and means including a strap underlying said plate and extending through said U-shaped bracket for detachably securing the receptacles to said plate.

10. In a dispensing apparatus, the combination of a plurality of upstanding legs, a receptacle support plate having an annular depending flange thereon, said legs having a first roller thereon mounted for rotation about a horizontal axis engageable with the lower edge of said flange for supporting the plate on the legs, said legs having a second roller thereon mounted for rotation about an upright axis and engageable with the side of said flange, a plurality of receptacles mounted on said plate for rotation therewith, a measuring cylinder individual to each receptacle, means in each cylinder adapted upon actuation to dispense a measured quantity of material from the cylinder, means at a dispensing station for operating the dispensing means of the measuring cylinder positioned thereat, and means connected to said plate for rotating the same to position a selected one of said cylinders at the dispensing station.

11. A dispensing apparatus comprising a base, a carrier rotatably mounted on said base and having a plurality of separate compartments, a measuring chamber individual to each of said compartments, a piston in each measuring chamber having an operating rod extending outwardly therefrom, means for rotating said carrier to position a selected one of said measuring chambers at a dispensing station, a jaw at the dispensing station engageable with the piston rod thereat, drive means reciprocably supporting said jaw thereon and operative to extend and retract the jaw relative thereto, adjustable stop means on said base for limiting extension of said jaw to thereby regulate the amount of material dispensed, means supporting said drive means on said base for limited movement relative to the base in a direction parallel to the path of said jaw, and spring means connected to said base and to said drive means and adapted to yield and permit movement of the drive means relative to the base when the pressure applied by the drive means to the jaw exceeds a preselected value.

12. A dispensing apparatus comprising a base, a carrier rotatably mounted on said base and having a plurality of separate compartments, a measuring chamber individual to each of said compartments, a piston in each measuring chamber having an operating rod extending outwardly therefrom, means for rotating said carrier to position a selected one of said chambers at the measuring station, a jaw at the dispensing station engageable with the piston rod thereat, a screw attached to said jaw, a guide block slidably supporting said screw, a gear threaded on said screw and engaging said block to extend and retract the screw in response to rotation of the gear, means for rotating said gear, means mounting said block on said base for limited movement in a direction parallel to the path of said jaw, selectively adjustable stop means engageable with said jaw to limit extension thereof, and spring means connected to said base and to said block and adapted to yield and permit movement of the block relative to the base when the pressure applied by the screw to the jaw exceeds a preselected value.

13. A liquid dispensing machine comprising a base, a plurality of annularly spaced dispensing units mounted on the base for rotation about a common axis to enable advancement of any selected one of the dispensing units to a dispensing station, said units each comprising a storage reservoir and a measuring cylinder connected to each reservoir for rotation therewith, said units also including a piston in each cylinder movable from an initial position to a displaced position and back for dispensing a quantity of material proportional to the distance between said initial and said displaced position, each of said pistons having a rod connected thereto and a head on the outer end of each rod movable in a circular path as the reservoirs are rotated, a common pump drive means at the dispensing station, said drive means including a jaw normally positioned to span the path of movement of said heads when the pistons are in said initial position thereof, said jaw being dimensioned to loosely receive said heads as the reservoirs are rotated and having a first jaw face engageable with the heads to move the pistons from said initial to said displaced position thereof and a second jaw face engageable with said heads to move the pistons from the displaced position back to the initial position thereof as the jaw is returned to its initial position, said drive means including selectively operable means for reciprocating said jaw, stop means engageable with drive means for stopping said jaw in said normal position thereof, and interlock means engageable with the dispensing unit at the dispensing station and operative when the drive means moves the piston of the unit at the dispensing station out of its initial position for locking said dispensing units against rotation to thereby assure return of the piston to its initial position prior to rotation of the dispensing units.

14. In a dispensing apparatus, the combination of a frame, a carrier rotatably mounted on said frame and having a plurality of separate storage compartments, a plurality of reciprocable dispensing pumps each including a measuring chamber individual to each of said compartments and a reciprocable dispensing member in each chamber movable from an initial position to a selectively variable displaced position and back for dispensing a quantity of material from the chamber proportional to the distance between said initial and said displaced position, said carrier being rotatable to position a selected one of said measuring chambers at the dispensing station, common dispenser pump operating means at the dispensing station movable through a selectively variable stroke and engageable with the dispensing member associated with the measuring chamber at the dispensing station for moving the dispensing member between said positions thereof to dispense a selected quantity of material from that chamber, and common measuring chamber support means mounted on said frame at the dispensing station and selectively movable into and out of position supporting the measuring chamber at the dispensing station against movement in a direction parallel to the direction of movement of the dispensing member in the chamber.

15. In a dispensing apparatus, the combination of a frame, a carrier rotatably mounted on said frame and having a plurality of separate storage compartments, a plurality of reciprocable dispensing pumps each including a measuring chamber individual to each of said compartments and a reciprocable dispensing member in each chamber movable from an initial position to a selectively variable displaced position and back for dispensing a quantity of material from the chamber proportional to the distance between said initial and said displaced position, said carrier being rotatable to position a selected one of said measuring chambers at the dispensing station, common dispenser pump operating means at the dispensing station movable through a selectively variable stroke and engageable with the dispensing member associated with the measuring chamber at the dispensing station for moving the dispensing member between said positions thereof to dispense a selected quantity of material from that chamber, and common measuring chamber support means mounted on said frame at the dispensing station and selectively movable into and out of engagement with the measuring chamber thereat, said support means having means for supporting said measuring chamber against movement in a direction parallel to the direction of movement of the dispensing member in the chamber and for also locking the measuring chamber at the dispensing station against turning with said carrier to locate the measuring chamber in proper position with respect to said operating means.

16. In a dispensing machine, the combination of a base, a frame on said base, a carrier mounted on said frame for rotation about an axis and having a plurality of annularly spaced dispensing units, said units each comprising a storage reservoir and reciprocable dispensing pump individual to each reservoir, said pumps having a measuring cylinder communicating with a respective one of the reservoirs and extending generally parallel to said axis and a reciprocable dispensing member in each cylinder movable from an initial position to a selectively variable displaced position and back for dispensing a quantity of material from a cylinder proportional to the distance between said initial and said displaced position, said carrier being rotatable to position a selected one of the measuring cylinders at the dispensing station, common dispensing pump operating means at the dispensing station movable through a selectively variable stroke and engageable with the dispensing member associated with the dispensing unit at the dispensing station for moving the dispensing member between said positions thereof to dispense a selected quantity of material from that chamber, and common support means mounted on said frame at the dispensing station and selectively movable into and out of engagement with the unit at the dispensing station for supporting the same against movement in a direction parallel to the direction of movement of the dispensing member in the measuring cylinder.

17. The combination of claim 16 including means for locking said operating means against movement until said support means is moved into engagement with the unit at the dispensing station.

18. The combination of claim 16 wherein said support means includes a generally upright member pivotally mounted at the lower end thereof on said base for movement toward and away from said carrier.

19. In a dispensing machine, the combination of a base, a frame on said base, a carrier mounted on said frame for rotation about an axis and having a plurality of annularly spaced dispensing units, said units each comprising a storage reservoir and reciprocable dispensing pump individual to each reservoir, said pumps having a measuring cylinder communicating with a respective one of the reservoirs and extending generally parallel to said axis and a reciprocable dispensing member in each cylinder movable from an initial position to a selectively variable displaced position and back for dispensing a quantity of material from a cylinder porportional to the distance between said initial and said displaced position, said carrier being rotatable to position a selected one of the measuring cylinders at the dispensing station, common dispensing pump operating means at the dispensing station movable through a selectively variable stroke and engageable with the dispensing member associated with the dispensing unit at the dispensing station for moving the dispensing member between said positions thereof to dispense a selected quantity of material from that chamber, and common support means mounted on said frame at the dispensing station for movement in a direction transverse to the direction of movement of the dispensing member in the cylinder into and out of engagement with the dispensing unit at the dispensing station, said support means having means for supporting said dispensing unit against movement in a direction parallel to the direction of movement of the dispensing member in the chamber and for also locking said dispensing unit against turning movement with the carrier to locate the dispensing unit in proper position with respect to said operating means.

20. In a dispensing apparatus, the combination of a support base, a carrier rotatably mounted on said base and including a plurality of annularly spaced dispensing units, said units each comprising a storage compartment and a reciprocable dispensing pump individual to each compartment, said dispensing pump each including a measuring chamber and a reciprocable dispensing member in each chamber for dispensing material therefrom in an amount proportional to the movement of the dispensing member in the chamber, a common manually controlled operating means at said dispensing station movable from an initial position to a displaced position and back for reciprocating said dispensing members, a common adjustable stop means at said dispensing station for limiting the stroke of said operating means to vary the quantity of material dispensed, locking means movable into and out of locking position locking said carrier against rotation, and means connected to said operating means and engageable with said locking means for preventing movement of said locking means out of its carrier locking position when said operating means is out of said initial position thereof.

21. In a dispensing apparatus, the combination of a support base, a carrier rotatably mounted on said base, and including a plurality of annularly spaced dispensing units, said units each comprising a storage compartment and a reciprocable dispensing pump individual to each compartment, said dispensing pumps, each including a measuring chamber and a reciprocable dispensing member in each chamber for dispensing material therefrom in an amount proportional to the movement of the dispensing member in the chamber, a common manually controlled operating means at said dispensing station movable from an initial position to a displaced position and back for reciprocating said dispensing members, a common adjustable stop means at said dispensing station for limiting the stroke of said operation means to vary the quantity of material dispensed, locking means movable into and out of a locking position locking said carrier against rotation, and means engageable with said carrier locking means for preventing movement of said operating means away from its initial position when said carrier locking means is out of its lock position and for preventing movement of said carrier locking means out of its carrier locking position when said operating means is out of said initial position thereof.

22. In a dispensing apparatus, the combination of a support base, a carrier rotatably mounted on said base and including a plurality of annularly spaced dispensing units, said units each comprising a storage compartment and a reciprocable dispensing pump individual to each compartment, said dispensing pumps each including a measuring chamber and a reciprocable dispensing member in each chamber for dispensing material therefrom in an amount proportional to the movement of the dispensing member in the chamber, a common manually controlled operating means at said dispensing station movable from an initial position to a displaced position and back for reciprocating said dispensing members, a common adjustable stop means at said dispensing station for limiting the stroke of said operating means to vary the quantity of material dispensed, locking means movable into and out of a position locking said carrier against rotation, and means connected to said operating means and engageable with locking means for preventing movement of said locking means out of its carrier locking position when said operating means is out of said initial position thereof, and for preventing movement of said carrier locking means out of its carrier locking position when said operator is out of said initial position thereof.

23. The combination of claim 22 wherein said locking means has means thereon for supporting said measuring chamber against movement in the direction of reciprocation of said dispensing member when the locking means is in its carrier locking position.

24. In a dispensing apparatus, the combination of a frame, a carrier rotatably mounted on said frame for rotation about an axis and having a plurality of annularly spaced dispensing units rotatable with the carrier to enable positioning of any selected unit at the dispersing station, said units each comprising a storage reservoir and a reciprocable dispensing pump individual to each reservoir, said pumps having a measuring cylinder communicating with a respective reservoir and a reciprocable dispensing member in each cylinder movable from an initial position to a selectively variable displaced position and back for dispensing a quantity of material from the cylinder proportional to the distance between said initial and said displaced position, a common dispensing pump operating means at the dispensing station having a drive member movable from a first position to a second position and back to said first position, said drive member engaging the dispensing member of the unit at the dispensing station for reciprocating the same from said initial to said displaced position and back in response to movement of said drive member from said first position to said second position and back, stop means for stopping said drive member at said first position thereof, and interlock means mounted on said frame and engageable with the dispensing unit at the dispensing station when the drive means moves the dispensing member of the unit at the dispensing station out of its initial position for locking said dispensing unit against turning with the carrier to thereby assure return of the dispensing member to its initial position and return of said drive member to said first position thereof prior to the rotation of the carrier.

References Cited in the file of this patent

UNITED STATES PATENTS

| | | |
|---|---|---|
| 280,979 | Westphal | July 10, 1883 |
| 686,296 | Helmer | Nov. 12, 1901 |
| 870,196 | Perritt | Nov. 5, 1907 |
| 2,158,774 | Grubelic | May 16, 1939 |
| 2,326,359 | Humbert | Aug. 10, 1943 |
| 2,787,402 | Stiner et al. | Apr. 2, 1957 |
| 2,801,031 | Hunter | July 30, 1957 |
| 2,848,019 | Corbin et al. | Aug. 19, 1958 |